United States Patent [19]

Charland

[11] 4,273,148
[45] Jun. 16, 1981

[54] STEM SEAL FOR A FIRE SAFE BALL VALVE

[75] Inventor: Raymond J. Charland, South Windsor, Conn.

[73] Assignee: Litton Industrial Products, Inc., East Hartford, Conn.

[21] Appl. No.: 142,449

[22] Filed: Apr. 21, 1980

[51] Int. Cl.³ .......................... F16K 41/00; F15J 15/54
[52] U.S. Cl. ..................................... 137/72; 251/214; 277/26; 277/DIG. 6
[58] Field of Search .................. 251/214; 277/26, 105, 277/DIG. 6; 137/72, 74

[56] References Cited

U.S. PATENT DOCUMENTS

| | | | |
|---|---|---|---|
| 3,319,647 | 5/1967 | Morain | 251/214 |
| 3,472,254 | 10/1969 | Reed, Jr. et al. | 277/26 |
| 3,540,740 | 11/1970 | Smith | 277/26 |
| 3,567,176 | 12/1968 | Johnson | 251/214 |
| 3,586,289 | 6/1971 | Priese | 251/214 |
| 3,630,483 | 12/1971 | Canalizo | 251/214 |
| 4,006,681 | 2/1977 | Gaillard | 251/214 |
| 4,105,040 | 6/1977 | Chester | 277/26 |
| 4,157,835 | 6/1979 | Kahle et al. | 277/DIG. 6 |
| 4,190,257 | 2/1980 | Schnitzler | 277/DIG. 6 |

Primary Examiner—Martin P. Schwadron
Assistant Examiner—G. L. Walton
Attorney, Agent, or Firm—C. Frederick Koenig, III

[57] ABSTRACT

In a ball valve including a cylindrical housing having a flow passage, a rotatable ball for selectively blocking the flow passage, and an external actuating handle, a fire safe stem seal comprising a stem having a selected diameter with a larger diametered shoulder portion on one end which is keyed for engaging the ball, and an opposite end for engagement with the actuating handle, the housing having a stem bore for matingly receiving the stem therethrough within a selected tolerance, a first interior step concentric with the stem bore and selectively sized to accommodate the stem shoulder, a second smaller selectively sized interior step concentric with the stem bore having a selected axial depth, a deformable heat-resistance second seal ring having an axial thickness substantially greater than the axial depth of the second step for engagement with the housing in the second step, a heat-destructible primary seal and bearing ring for engagement with the housing and the heat-resistant ring in the first step, and means to draw the stem shoulder against the heat-destructible primary ring in the first step which thereby compacts the heat-resistant ring in the second step and into the tolerance to effectively functionally lock the heat-resistant ring in a desired position around the stem.

3 Claims, 3 Drawing Figures

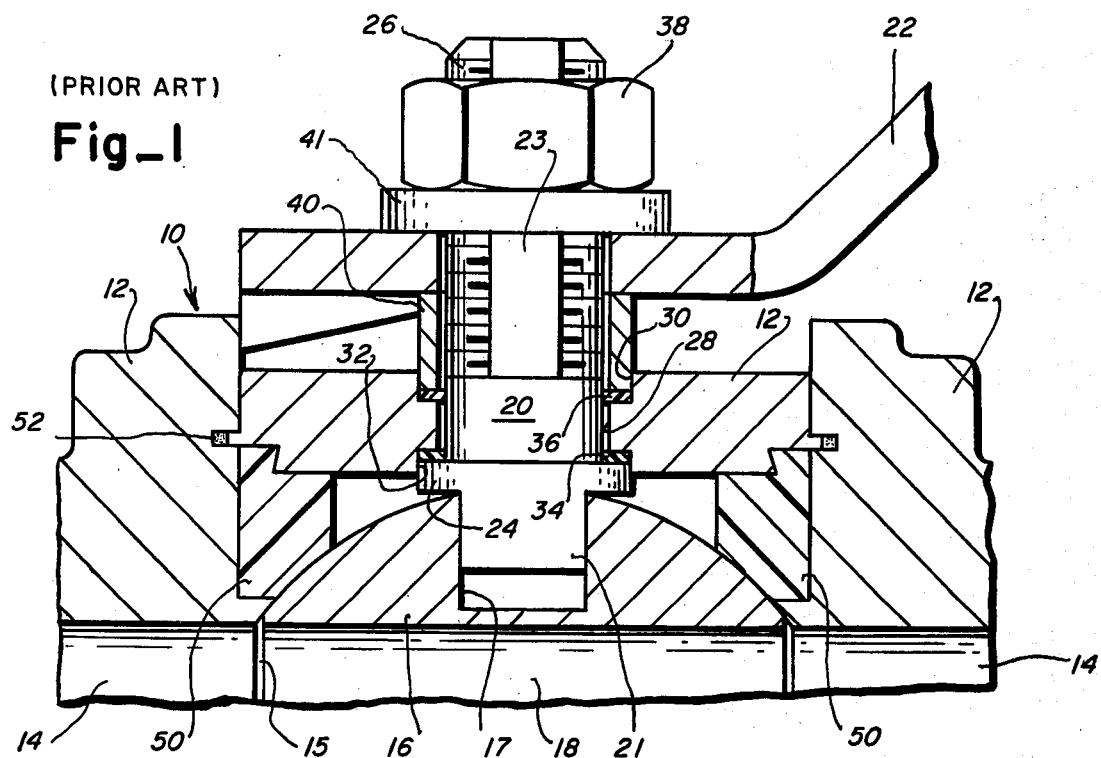
(PRIOR ART)
Fig_1
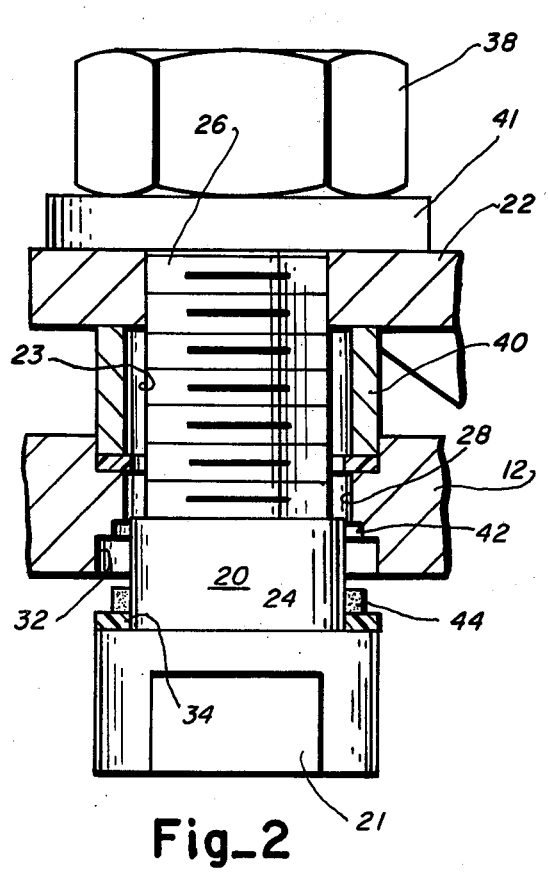
Fig_2
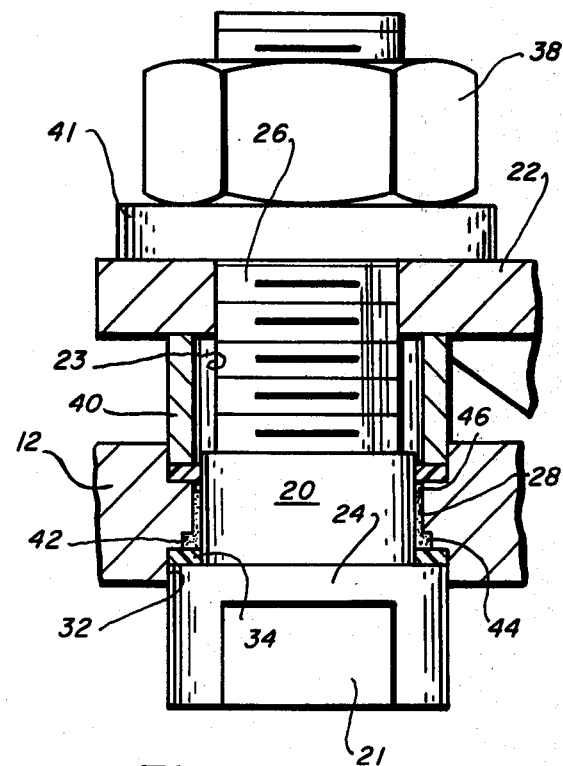
Fig_3

STEM SEAL FOR A FIRE SAFE BALL VALVE

This invention relates to ball valves, and more particularly, to a fire safe ball valve.

Ball valves which are designed for normal usage at relatively low temperatures utilize heat-destructible stem seals. However, when these valves are exposed to high temperatures, such as during a fire, leakage occurs at the stem since the seals are destroyed. For safety and other reasons, it is desirous to prevent leakage after the valve has been subjected to high temperatures until the destroyed seals can be replaced.

It is, accordingly, an object of the present invention to provide a fire safe ball valve having secondary heat-resistant sealing means to prevent stem leakage when primary seals are destroyed by intense heat or fire.

Other objects and advantages of the present invention will become apparent from the following portion of the specification and from the accompanying drawings which illustrate, in accordance with the mandate of the patent statutes, a presently preferred embodiment incorporating the principals of the invention.

Referring to the drawings:

FIG. 1 is a sectional view of a portion of a conventional fire safe ball valve which does not have the inventive fire safe stem seal;

FIG. 2 is a sectional view of the invention showing the stem seals before the stem is tightened; and FIG. 3 is a sectional view of the invention after the stem has been tightened showing the seals in sealing engagement.

As can be seen in FIG. 1, a conventional fire safe ball valve 10 includes a three-piece housing 12 having inlet and outlet ports 14 and a central cavity 15. A ball 16 having a bore 18 is mounted within this cavity 15 for rotative displacement about a vertical axis. When located at an open position, the ball bore 18 establishes a through passage with the horizontal inlet and outlet ports 14. This through passage may be selectively blocked by rotating the ball 16.

A stem 20 is provided which passes through a housing stem bore 28. The stem includes a drive key 21 which matingly engages a keyway 17 in the ball 16 so that the ball may be rotated by a handle 22 which engages flattened sides 23 of the threaded portion of the stem. The stem drive key 21 has a cylindrical shoulder 24 which is matingly received by an internal stepped portion 32 of the stem bore. The housing stem bore 28 also includes an external stepped portion 30. Seal rings 34 and 36, composed of a suitable material, such as polytetrafluourouethylene commonly known as Teflon, are located within the stepped portions 32 and 30. The tightening of a nut 38, which engages the threaded portion 26 of the stem, compresses the seal rings 34 and 36 within the stepped portions 32 and 30 between the stem shoulder 24 and a stem sleeve 40. The internal ring 34 serves as a pressure seal while the external ring 36 serves as a vacuum seal and both serve as bearings for the valve stem assembly. The nut 38 also serves to secure the handle 22 to the stem and is maintained in its tightened position by a lock washer 41.

Annular seal seats 50 are compressively located between the valve housing 12 and the ball 16 and may be comprised of Teflon. Under low temperature conditions, the seat 50, together with the internal and external seal rings 34 and 36, provide the sealing required to maintain the integrity of the ball valve.

In such a conventional fire safe ball valve, when a fire occurred, the Teflon seal rings and seats 34, 36 and 50 would be destroyed and would no longer be capable of maintaining the desired seal. Pressurized fluid would pass between the ball 16 and housing 12 and push the drive key shoulder 24 upwardly into forced metal-to-metal engagement with the housing step to thereby maintain the stem seal. Additionally, heat-resistant seals 52, compressively located in an annular channel between the housing elements 12, maintained the seal therebetween. However, it was found that the sealing provided by the metal-to-metal contact of shoulder 24 and stepped portion 32 would fail to adequately perform and leakage would occur around the stem.

The preferred embodiment of the fire safe stem seal of the present invention is shown in FIGS. 2 and 3. A smaller interior step 42 concentric with bore 28 is machined in the housing 12 for receiving a secondary heat-resistant seal 44 composed of a deformable substance, such as expanded graphite commonly sold under the tradename of "Grafoil".

When the valve is assembled and the stem nut 38 is tightened to operative position, the interior heat-destructible Teflon seal 34 is compressively located between the interior step 32 and the stem shoulder 24 establishing the desired seal. The axial thickness of the Grafoil seal 44 (50% greater than the axial depth of the second interior step 42 in the preferred embodiment) is selected so that the compression of the interior Teflon seal 34, caused by tightening the nut 38, will plastically deform a portion of the Grafoil seal 44 upwardly into a substantial axial segment of the clearance 46 between the stem 20 and the housing stem bore 28 thereby effectively functionally locking the Grafoil seal 44 within the second step 42.

When the ball valve is subjected to intense heat or a fire and the primary seal ring 34 disintegrates, the heat-resistant seal ring 44, which is effectively functionally locked in position by the portion thereof plastically deformed and wedged into the stem clearance 46, maintains the integrity of the stem seal by sealing in interior groove 42 and in the clearance 46 between the stem 20 and the housing 12.

In practice, it has been found that the secondary seal holds for at least several valve operations after the primary seal has been destroyed. However, the secondary seal, provided by the seal ring 44, is intended merely as a fail safe until the primary seals are replaced.

What is claimed is:

1. In a ball valve including a cylindrical housing having a flow passage, rotatable ball means for selectively blocking said flow passage, and external actuating means, a fire safe stem seal comprising:

a stem having a selected diameter with a larger diametered shoulder portion on one end including means for engaging the ball means, and an opposite end for engagement with the actuating means, the housing having a stem bore for matingly receiving said stem therethrough within a selected tolerance, a first interior step concentric with said stem bore and selectively sized to accommodate said stem shoulder, and a second smaller selectively sized interior step concentric with said stem bore having a selected axial depth, a deformable heat-resistant secondary seal ring having an axial thickness substantially greater than said axial depth of said second step for engagement with the housing in said second step, a heat-destructible primary seal and bearing ring for engagement with the housing and said heat-resistant ring in said first step, and means to draw said stem shoulder against said heat-destructible primary ring in said first step which thereby compacts said heat-resistant ring in said second step and into said tolerance to effectively functionally lock said heat-resistant ring in a desired position around said stem, whereby said heat-destructible ring acts to seal the housing between said first step and said stem shoulder and serves to retain said heat-resistant ring in position to protect it from abrasive stem shoulder rotation while serving as a bearing for said stem shoulder, and whereby when the valve is subjected to intense heat and said heat-destructible ring disintegrates, said heat-resistant ring acts to seal said housing between said stem bore and second step and said stem and stem shoulder.

2. A ball valve comprising:

a housing including inlet and outlet ports and an internal cavity, a ball having a flow passage therethrough and a control keyway therein supported within said cavity and displaceable from an open to a closed position, said housing further including a cylindrical stem bore having first and second concentric interior steps defined therein, said second step having a selected axial depth, a valve stem including a drive key at one end for mating insertion into said ball keyway and a selectively diametered portion for mating insertion through said bore of said housing with a selected clearance therebetween, said drive key having an interior cylindrical shoulder selectively dimensioned for mating insertion into said first concentric step, a heat-destructible bearing and seal ring selectively configured for location within said first concentric step, means for forcefully displacing said shoulder into said first concentric step to selectively compressively locate said heat-destructible ring therein, a deformable heat-resistant seal ring selectively configured for mating insertion into said second step and having an axial thickness substantially larger than said axial depth of said second step so that when said heat-destructible ring is compressed to said selected compression, a portion of said heat-resistant seal ring will be plastically deformed into said clearance in said stem bore between said stem and said housing thereby functionally locking said heat-resistant seal in operative position.

3. A ball valve according to claim 1 or 2, wherein said heat-destructible seal ring is formed of a material of the class of polytetrafluouroethylene and said heat-resistant seal ring is formed of a material of the class of expanded graphite.

* * * * *